Feb. 10, 1970 W. M. AUSTIN 3,495,030

COLOR KILLER CIRCUITS CONTROLLED BY THE LOCAL OSCILLATOR

Filed June 12, 1967 2 Sheets-Sheet 1

INVENTOR
WAYNE M. AUSTIN

BY Donald H. Timlie

ATTORNEY

Feb. 10, 1970 W. M. AUSTIN 3,495,030

COLOR KILLER CIRCUITS CONTROLLED BY THE LOCAL OSCILLATOR

Filed June 12, 1967 2 Sheets-Sheet 2

INVENTOR
WAYNE M. AUSTIN

BY Donald N. Timbie
ATTORNEY

United States Patent Office 3,495,030
Patented Feb. 10, 1970

3,495,030

COLOR KILLER CIRCUITS CONTROLLED BY THE LOCAL OSCILLATOR

Wayne Miller Austin, Flemington, N.J., assignor to RCA Corporation, a corporation of Delaware Filed June 12, 1967, Ser. No. 645,276
Int. Cl. H04n 5/38, 5/44
U.S. Cl. 178—5.4 5 Claims

ABSTRACT OF THE DISCLOSURE

The change in voltage produced by the presence or absence of color synchronizing bursts across a resistor in the output circuit of an injection locked color reference oscillator of a color television receiver is used to control the conductivity of the color signal channel.

Figure 1:
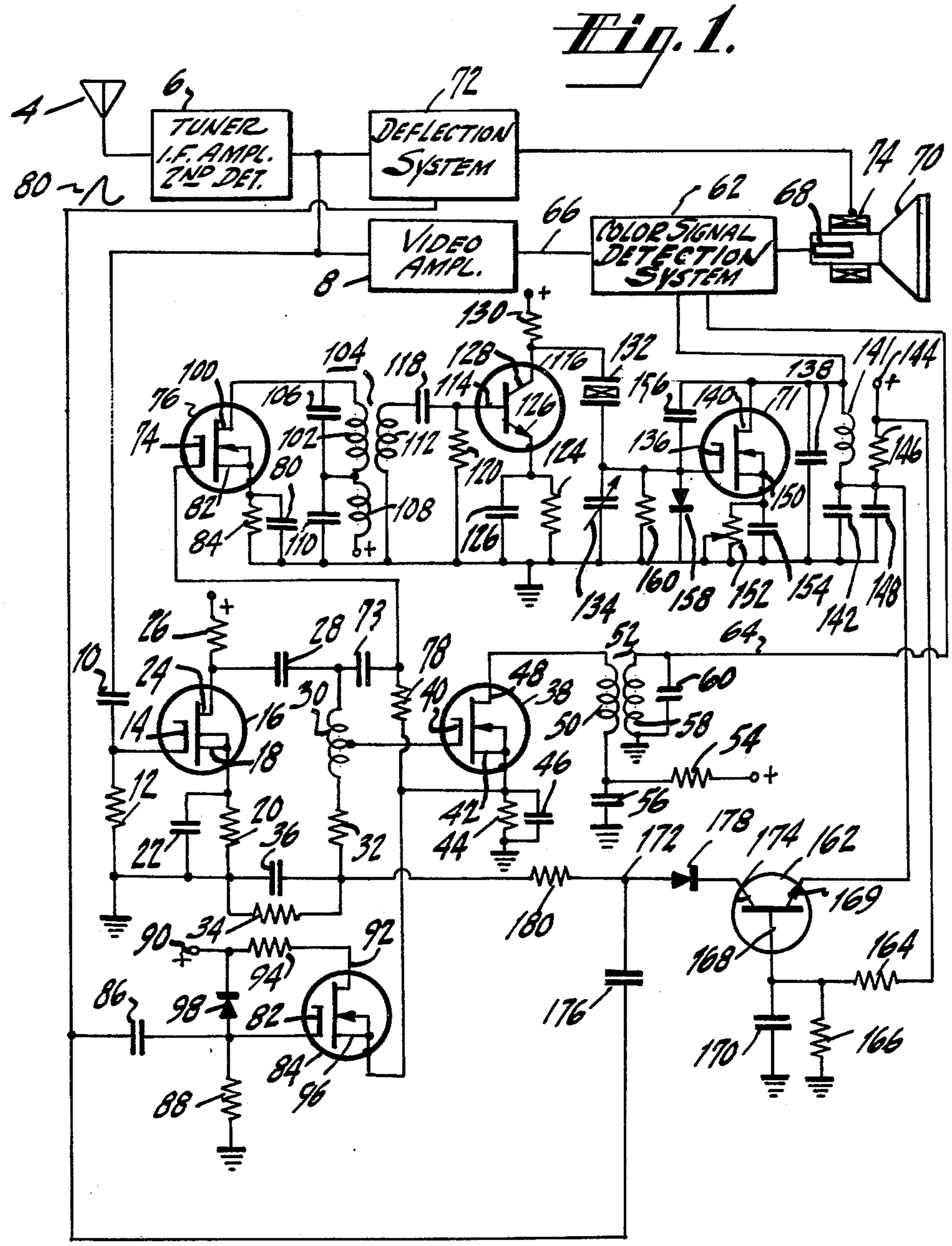

This invention relates to improvements in color killer circuits that are used in color television receivers to prevent signals from passing through the color channel during reception of a monochrome transmission. Without such circuits, noise and certain signal components can pass through the color channel and produce spurious colors in the image.

In some color television receivers designed to operate in response to signals transmitted in accordance with the standards presently utilized in the U.S.A., the conductivity of the color signal channel is controlled by the change in a negative direction of the direct current voltage produced at an input electrode of an injection locked color reference oscillator when color synchronizing bursts are present in the received signal. As the change in voltage is often too small and in the wrong direction for direct application to the color signal channel, color killer amplifiers have been used. The change in voltage at the input electrode of the oscillator should be large enough to ensure driving any color killer amplifier that falls within the specification limits from saturation to cut-off, and whereas this can be accomplished, it often adds to the cost of the receiver by requiring additional burst amplification or more expensive color killer amplifiers. Furthermore, because the color killer amplifier is coupled to a sensitive input electrode of the oscillator, special care must be taken that the impedance it presents to the input electrode be such as not to interfere with the proper operation of the oscillator. These functions combined place severe economical restrictions on the circuit designer.

Accordingly it is an object of this invention to provide an improved color killer circuit in which a given amplitude of color synchronizing burst produces a greater amount of drive voltage for the color killer amplifier.

It is another object of this invention to provide an improved color killer circuit wherein the coupling of the drive voltage developed by the oscillator to the color killer amplifier is accomplished in such manner as to reduce the effort which the impedance of the amplifier can have on the operation of the oscillator.

It is still another object of this invention to provide a direct current voltage that changes in value by a greater amount when color synchronizing bursts are present and which also changes in a positive rather than a negative direction.

Theses objectives may be attained in accordance with this invention by connecting a resistor and a source of direct current potential between an output electrode and one of two input electrodes of an injection locked oscillator so that the change in direct current voltage produced between the input electrodes where the color synchronizing bursts are present in the received signal appears in amplified form across the resistor. This amplified voltage is then used to control the color killer circuit, and it can be directly used to control the conductivity of the color channel so as to avoid the need for a color killer amplifier.

Color killer circuits are usually provided with a threshold that can be adjusted so as to render the signal channel conductive when the received color signals have attained a desired level. When a field effect transistor is used as the active device in the color reference oscillator, it exhibits the desired operating characteristics as long as the direct current flowing between the source and drain electrodes lies within a given range. It has been found that this current varies beyond the desired range from transistor to transistor even though the applied voltages are the same, and, accordingly, it is desirable to provide means for adjusting the current so that its value lies within the range. An important advantage of this invention lies in the fact that the means for adjusting the direct current in the transistor can be used as the color killer threshold control. This arises from the fact that variation in the direct current within the desired range produces a variation in the voltage across the aforementioned resistor that is of sufficient magnitude to be used to set the color killer threshold at a desired value.

Figures 2, 3:
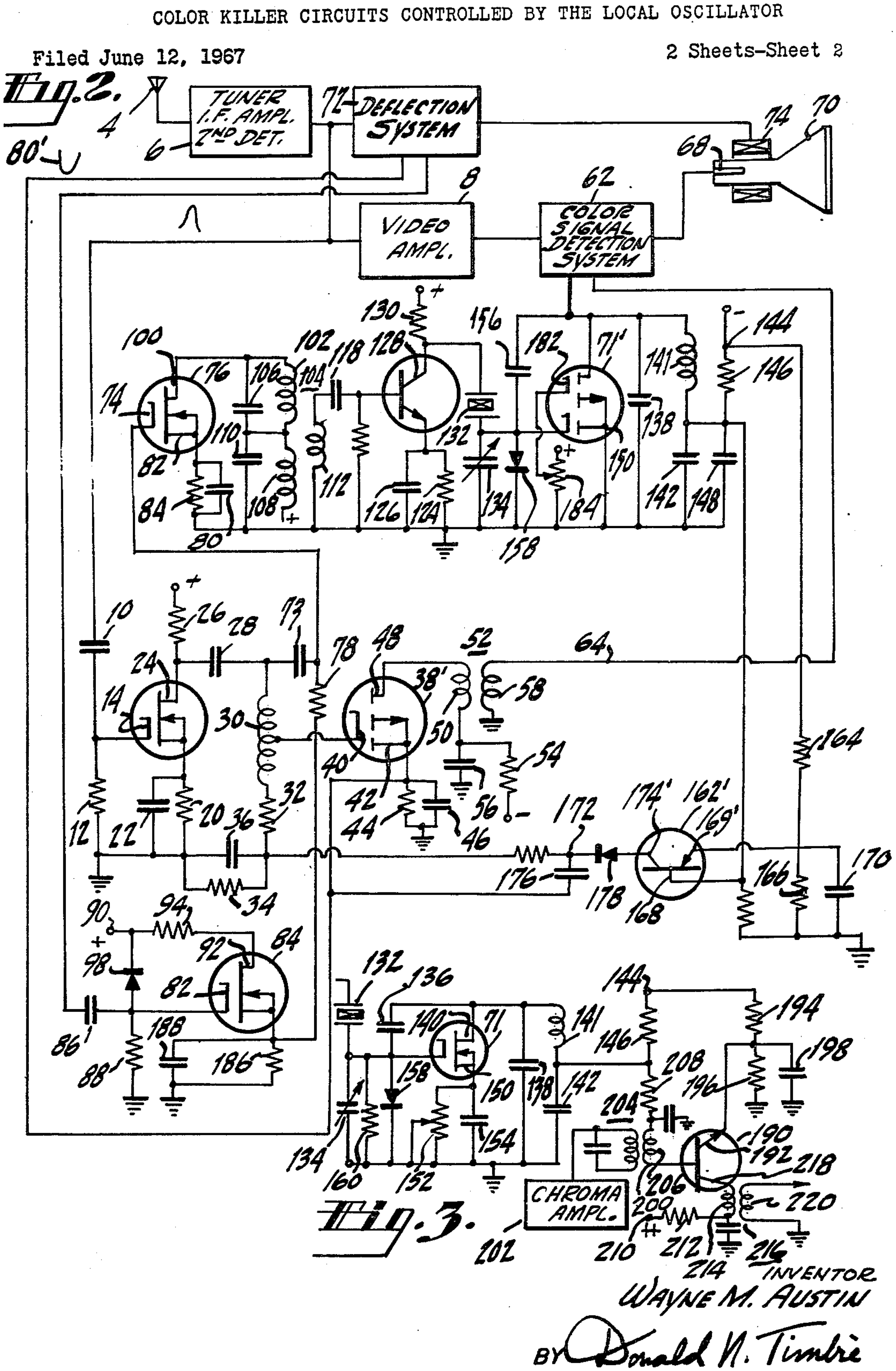

The features of this invention which are believed to be novel are set forth with particularity in the appended claims. Both the organization and manner of operation of the invention may be best understood by reference to the following description taken in conjunction with the accompanying drawing in which:

FIGURES 1 and 2 illustrate a circuit of this invention which uses color killer amplifiers and which differ primarily in the types of active devices used for the oscillator, the color killer amplifier and the bandpass amplifier, and FIGURE 3 illustrates a circuit in which the change in direct current voltage supplied by the oscillator is applied to the bandpass amplifier, the need for a color killer amplifier thereby being avoided.

Reference is now made to FIGURE 1 for a description of the principal operating components of one form of color television receiver in which the color killer circuit of this invention may be used. Transmitted signals are intercepted by an antenna 4 and the video signals of a selected channel are derived therefrom by a tuner, intermediate frequency amplifier and second detector contained within the rectangle 6. The detected signals are applied to a video amplifier 8.

They are also coupled by a capacitor 10 and a resistor 12 to a gate electrode 14 of an N channel depletion type insulated gate transistor 16 that serves as first chroma amplifier. Bias voltage for the source electrode 18 is provided by a resistor 20 and a parallel signal bypass capacitor 22 connected between the source electrode 12 and ground, and positive operating potential is supplied to the drain 24 via a resistor 26. The amplifier 16 is made selectively responsive to the band of chrominance signal frequencies in the upper end of the video signal spectrum by a series circuit comprised of a capacitor 28, an inductor 30 and a Q spoiling resistor 32 that is resonant at the frequency of the color subcarrier and which is coupled between the drain electrode 24 and signal ground. For reasons which will be explained a biasing network, comprised of a gate leak resistor 34 and a parallel signal bypass capacitor 36 is inserted between ground and the series circuits 20, 30 and 32.

A bandpass amplifier, herein illustrated as an N channel depletion type field effect transistor 38 is coupled to the chrominance amplifier 16 by a connection between the gate electrode 40 and a point on the inductor 30. Its source electrode 42 is connected to ground via a biasing resistor 44 and a parallel signal bypass capacitor 46, and its drain electrode 48 is connected via a primary winding 50 of an output transformer 52 and a resistor 54 to a point of positive potential. A capacitor 56 serves to establish the junction between the primary winding 50 and the resistor 54 at ground for chrominance signal frequencies. The primary winding 50 is tuned to parallel resonance at one frequency by stray capacitance not shown, and the secondary winding 58 is tuned to resonance by a parallel capacitor 60 at a different frequency so as to provide a passband for the frequencies of the chrominance signals. The chrominance signals produced across the secondary winding 58 are applied to a color signal detection system 62 via a lead 64 and are combined therein in a manner described in the July 1966 issue of the I.E.E.E. Transactions on Broadcast and Television Receivers with video signals from the video amplifier 8 and a reference wave of sub-carrier frequency so as to form red, green and blue video signals that are applied to suitable electrodes of electron gun 68 in a color cathode ray tube 70. Alternatively, the color signal detection system 62 could derive the color difference signals $R-Y$, $G-Y$ and $B-Y$, as is done in most color receivers, in which event these signals could be combined with the video signals in the cathode ray tube 70 in a manner set forth in the U.S. Patent No. 3,119,899, which is assigned to the same assignee as this invention.

The reference wave of subcarrier frequency referred to above is derived from an injection locked color reference oscillator 71 that is synchronized in phase and frequency by the color synchronizing bursts in the following manner. The chrominance signals supplied by the chrominance amplifier 16 across the inductor 30 are coupled via a capacitor 73 to the gate electrode 74 of a burst keying amplifier 76 which is rendered conductive only when the bursts are present in the chrominance signals by application of positive keying pulses to the gate electrode 74 via an isolating resistor 78. In between the positive pulses the burst keying amplifier 76 is biased beyond cut-off by charge stored on a capacitor 80 that is connected between the source electrode 82 and ground. Appropriate leakage of this charge is provided by the resistor 84.

In the particular circuit illustrated the keying pulses for the gate electrode 74 of the burst keying amplifier 76 are derived by coupling positive line frequency flyback pulses 80 from the deflection system 72 to the gate electrode 82 of a keying pulse amplifier 84 via a capacitor 86 and a resistor 88. Positive voltage for the drain electrode 92 is supplied from the point 90 via a drain resistor 94, and the source electrode 96 is connected to the source electrode 42 of the bandpass amplifier 38 and to the lower end of the isolating resistor 78. A diode 98 is connected between the gate electrode 82 and the point 90 of positive potential. During the portion of the flyback pulse that is positive with respect to the voltage at the point 90 both the amplifier 84 and the diode 98 conduct. However, in the periods between the flyback pulses 80, the amplifier 84 is cut-off by discharge through the resistor 88 of the charge built up on the capacitor 86 by the current drawn through the diode 98. The conduction of the keying amplifier 84 during the flyback pulses 80 produces positive pulses across the common source resistor 44 that are applied via the resistor 78 to the gate electrode 74 so as to cause the burst keying amplifier 76 to conduct. The pulses cut-off the chrominance bandpass amplifier 38 so as to prevent the color synchronizing bursts from passing on to the color signal detection system 62.

Because the burst keying amplifier conducts only when the bursts are present they appear in amplified form across the output load circuit for the drain electrode 100. The load circuit is comprised of a primary winding 102 of a transformer 104 connected in parallel with a capacitor 106 and resonant therewith at the color subcarrier frequency. Positive operating voltage is applied to the drain electrode 100 via a choke inductor 108, and a signal ground is provided by a capacitor 110 at the junction of the primary winding 102 and the choke coil 108. A secondary winding 112 of the transformer 104 couples the amplified color synchronizing bursts to the base electrode 114 of a burst amplifier 116 via a capacitor 118 and a resistor 120. The emitter electrode 122 is biased by a resistor 124 shunted by a signal bypass capacitor 126, and operating voltage for the collector electrode 128 is applied via a resistor 130. A crystal 132 and a variable capacitor 134 form a high Q series circuit between the collector electrode 128 and ground that is resonant at the color subcarrier frequency.

The oscillator 71 is synchronized by applying the continuous wave of color subcarrier frequency developed across the capacitor 134 to the gate electrode 136 of an N channel insulated gate depletion type transistor such as TA2840. In the oscillator circuit, a capacitor 138 is connected between the drain electrode 140 and ground, and an inductor 141 and a signal bypass capacitor 142 are connected in series between the drain 140 and ground so as to form with the capacitor 138 a parallel circuit that is resonant at the frequency of the color subcarrier. Positive direct current voltage is applied to a point 144, and a drain resistor 146 is connected between the point 144 and the junction of the inductor 141 and the capacitor 142. A capacitor 148 in parallel with the capacitor 142 provides additional signal bypass. The source electrode 150 is connected to ground by a variable resistor 152 shunted by a signal bypass capacitor 154. If required additional regenerative coupling is provided by a capacitor 156 connected between the drain electrode 140 and the gate electrode 136. Because the gate electrode 136 does not draw current, a diode 158 is connected between it and ground. A leak resistor 160 is connected in shunt with the diode.

During the absence of the color synchronizing bursts, the alternating current voltage of color subcarrier frequency that is coupled to the gate electrode 136 by the oscillator 71 is clamped by the action of the diode 158 so as to produce a negative voltage at the gate electrode. However, when the bursts are present, and the oscillator 71 is synchronized, the continuous wave of subcarrier frequency applied to the gate electrode 136 from the capacitor 134 adds in phase to the alternating current wave produced at the gate electrode 136 by oscillator action so as to increase the amplitude of the alternating current voltage and the negative direct current voltage at this electrode. As a result, the direct current flowing from ground through the variable resistor 152, the path between the source and drain electrodes and the drain resistor 146 is reduced. The decrease in the direct current voltage drop produced across the resistor 146 is used as an indication that color signals are being received and is applied to means, such as a color killer transistor amplifier 162 for rendering the color signal channel of the receiver capable of passing signals.

The color killer amplifier 162 operates as follows. Voltage dividing resistors 164 and 166 are connected between the positive voltage point 144 and ground, and their junction is connected to the base electrode 168. The lower end of the drain resistor 146 is connected to the emitter electrode 169. A capacitor 170 is connected in shunt with the resistor 166. The values of the resistors 164 and 166 are selected so that the transistor 162 is forward biased when the voltage drop across the drain resistor 146 is that which occurs in the absence of color synchronizing bursts. Under these conditions a pulsating negative direct current voltage is produced at that point 172 by coupling the positive flyback pulse 80 to the collector electrode 174 via a capacitor 176 and a diode 178 that reduces the leakage. This voltage is smoothed out by the capacitor 36 and the resistor 180 and applied to the gate electrode 40 of the bandpass amplifier 38 so as to prevent it from conducting and thus prevent signals or noise from passing through the color channel to the color signal detection system 62, as is required for color killing action.

When color signals are received, the color synchronizing bursts act, as has been described, to decrease the voltage drop across the drain resistor 146 to a point where the transistor 162 is cut-off, thus removing the negative voltage from the gate electrode 40 and permitting the bandpass amplifier 38 to conduct chrominance signals to the color signal detection system 62.

As has been mentioned, the direct current flowing between the source and drain electrodes 150 and 140 of the oscillator 71 should lie within a given range for satisfactory operation. The value of the resistance between the source electrode 150 and ground can be adjusted by varying the resistor 152 so that the direct current is at a point within the range which establishes the voltage at the emitter 169 of the transistor 162 at a desired threshold value. Thus the variable resistor 152 serves two functions. Furthermore if the tolerance of the various components of the color killer amplifier circuit are suitably selected, its operation can be used as an indication that the current in the oscillator 71 is within the desired range.

In FIGURE 2 components having junctions corresponding to those of FIGURE 1 are indicated by the same numerals, but where a different type of component is used, the numeral is primed. The oscillator 71' is a P channel enhancement type of field effect transistor which has a second gate electrode 182 connected to a potentiometer 184 for adjusting the operating direct current in the oscillator 71'. Such a device requires a negative voltage at the point 144. This makes it more convenient to use a PNP transistor as the color killer amplifier 162'. The emitter electrode 169' is connected to the junction of the resistors 164 and 166 and the base electrode 168 is connected to the drain resistor 146. As in FIGURE 1, the transistor 162' is biased in a forward direction when color signals are not being received. Negative flyback pulses 80' are coupled to the collector electrode 174 via a capacitor 176 and diode 178 so as to develop a positive voltage at the point 172. Application of this voltage to the gate electrode 40' of the P channel enhancement type field transistor 38' cuts-off current flow therein. When color signals are received, the voltage across the drain resistor 146 changes so as to cut-off the color killer amplifier transistor 162', thus preventing the development of positive voltage at the point 172 and permitting the bandpass amplifier 38' to conduct. The amplifier 38' is cut-off during the burst interval by application of the negative keying pulses to its source electrode 42'. Keying pulses for the burst keying amplifier 76 are developed, as before by the transistor 84, the only difference being that the source electrode 96 is provided with its own biasing circuit comprised of a resistor 186 and capacitor 188.

FIGURE 3 illustrates a portion of a color television receiver which is like that shown in FIGURE 1 except for the bandpass amplifier and the fact that no color killer amplifier is used. The oscillator 71 and its components are identical to FIGURE 1 and are indicated by the same numerals. The bandpass amplifier 190 is an NPN transistor having its emitter electrode 192 connected to the junction of voltage dividing resistors 194 and 196 that are connected in series between the positive voltage point 144 and ground, signal bypass being provided by the capacitor 198. The base electrode 200 is coupled to a chrominance amplifier 202 by a transformer 204, the secondary winding 206 being connected in series with an isolation resistor 208 between the base electrode 200 and the resistor 146. Further isolation between the oscillator 71 and the bandpass amplifier 190 is provided by a connection signal bypass capacitor between ground and the junction of the resistor 208 and the secondary winding 206. A direct current voltage more positive than that at the point 144 is applied at a point 210, and a resistor 212 and a primary winding 214 of a tuned bandpass transformer 216 are connected between the point 210 and the collector electrode 218. The secondary winding 220 would be connected to a color signal detection system. During the reception of monochrome signals the base electrode 200 is negative with respect to the emitter electrode 192 so that thetransistor is cut-off as required. As previously explained in connection with FIGURE 1, when color signals are received, the voltage drops across the drain resistor decreases thereby shifting the direct current voltage at the base electrode 200 in a positive direction so as to permit the bandpass amplifier 190 to conduct and permit the chrominance signals to pass to the color signal detection system. Variation of the resistance of the resistor 152 sets the direct current of the oscillator within a desired range and at the same time determines the level of color signals at which the bandpass amplifier 190 conducts.

What is claimed is:

1. In television apparatus adapted to produce monochrome pictures in response to monochrome signals and color pictures in response to color signals, the color signals including color synchronizing bursts of several cycles of a color subcarrier frequency, a color killer circuit comprising:

a color reference oscillator having a pair of control electrodes and an output electrode, a source of direct current voltage and a direct current load resistor connected in series between said output electrode and one of said control electrodes, means for setting the bias between said control electrodes so as to determine the value of operating direct current that flows through said resistor, thereby establishing said output electrode at a given value of direct current voltage, means coupled to said output electrode for controlling the passage of color signals to a picture forming device, said means preventing the passage of color signals when said output electrode is at said given value of voltage, means for deriving from said color synchronizing bursts, when present, an alternating current wave of the color subcarrier frequency, and means for coupling said alternating current wave between said control electrodes in such manner as to synchronize the phase and frequency of the oscillator therewith and to change by clamping action the direct current voltage between said control electrodes thereby changing the voltage at said output electrode from said given value to a different value, said means for controlling the passage of color signals being responsive to said different value of voltage to permit the passage of color signals to a picture forming device.

2. In television apparatus that produces monochrome pictures on a picture forming device in response to monochrome signals and color pictures on said device in response to color signals, the color signals including color synchronizing bursts of several cycles of wave of color subcarrier frequency, a color killer circuit comprising in combination:

a color reference oscillator having an output electrode and a pair of control electrodes, a resistor and a source of direct current voltage coupled to said output electrode of said oscillator so that at least a portion of the direct current flowing in said oscillator flows through said resistor, means for independently varying the value of the direct current component of the current flowing through said oscillator, means biasing said control electrodes so that the value of the direct current flowing through said oscillator changes with the amplitude of the alternating current voltage waves between said control electrodes, means for deriving an alternating current synchronizing wave from said color synchronizing bursts, when present, and applying said wave between said control electrodes so as to synchronize the phase and frequency of said oscillator therewith, and means responsive to the direct current voltage produced across said resistor when the color synchronizing bursts are not present for preventing the application of color signals to said picture forming device, said means also being responsive to the direct current voltage produced across said resistor when said color synchronizing bursts are present to cause color signals to be applied to said picture forming device.

3. In a color television receiver having a color signal channel, a color killer circuit comprising:

a field effect transistor having at least gate, source and drain electrodes, resonant circuit means coupled with said electrodes so as to form an oscillator, a source of direct current potential and a load resistor connected in a direct current path between said source and drain electrodes, means for setting the direct current flowing between said source and drain electrodes at a desired value, a unilateral current conducting device coupled between said gate and source electrodes so as to develop a bias voltage between said electrodes by clamping action, means for applying an alternating current wave between said gate and source electrodes when color signals are being received so as to synchronize said oscillator, and means responsive to the direct current voltage across said load resistor for controlling the passage of color signals through said color channel.

4. A color killer circuit as set forth in claim 3 wherein said means for controlling the passage of color signals through said color channel is comprised of:

a transistor having emitter, base and collector electrodes, means including said load resistor for producing a forward bias voltage between said base and emitter electrodes when said color signals are not being received and for producing a cut-off voltage therebetween when said color signals are being received, a source of pulses, means including a capacitor for coupling said source to said emitter and collector electrodes so as to produce, when said forward bias condition exists, a steady direct current voltage at said collector electrode, and control means in said color channel for or permitting the passage of signals through said channel, said means being coupled to said collector electrode and responsive to said steady direct current voltage, when it is present at said collector electrode to prevent the passage of signals through said channel.

5. In a color television receiver having a color signal channel, a color killer circuit comprising:

a color reference oscillator having:

an insulated gate field effect transistor having a gate, source and drain electrodes, a source of direct current voltage having positive and negative terminals, a variable resistnce means and a first oscillator frequency bypass capacitor connected in parallel between said source electrode and one of said terminals, a tuning capacitor connected between said one terminal and said drain electrode, an inductor and a second bypass capacitor connected in series between said one terminal and said drain electrode, a direct current load resistor connected between the other terminal of said source of direct current voltage and the junction of said second capacitor and said inductor, a source of waves of the color subcarrier frequency, coupled between said gate electrode and said one terminal of said source of direct current voltage, a unilateral current conducting device connected between said gate electrode and said one terminal of said source of direct current voltage, and means responsive to the direct current voltage at said junction for controlling the conductivity of said color channel.

References Cited

UNITED STATES PATENTS

| | | |
|---|---|---|
| 2,982,812 | 5/1961 | Rhodes et al. |
| 3,135,825 | 6/1964 | Moles et al. |

ROBERT L. GRIFFIN, Primary Examiner

RICHARD MURRAY, Assistant Examiner